(12) United States Patent
Patel

(10) Patent No.: US 10,657,312 B2
(45) Date of Patent: May 19, 2020

(54) DEPLOYING NEW FONT TECHNOLOGIES TO LEGACY OPERATING SYSTEMS

(71) Applicant: Adobe Inc., San Jose, CA (US)

(72) Inventor: Sairus Patel, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/816,576

(22) Filed: Nov. 17, 2017

(65) Prior Publication Data
US 2019/0155872 A1 May 23, 2019

(51) Int. Cl.
G06F 3/00 (2006.01)
G06F 40/109 (2020.01)

(52) U.S. Cl.
CPC .................. G06F 40/109 (2020.01)

(58) Field of Classification Search
CPC ............. G06F 11/3668; G06F 11/3684; G06F 11/1616; G06F 17/30991; G06F 19/00; G06F 40/109
See application file for complete search history.

(56) References Cited

U.S. PATENT DOCUMENTS

| | | | |
|---|---|---|---|
| 5,495,577 A | 2/1996 | Davis et al. | |
| 5,577,177 A | 11/1996 | Collins et al. | |
| 5,586,242 A | 12/1996 | McQueen, III et al. | |
| 5,926,565 A * | 7/1999 | Froessl | G06F 17/30017 382/181 |
| 6,288,726 B1 | 9/2001 | Ballard | |
| 6,321,243 B1 | 11/2001 | Ballard | |
| 6,501,475 B1 | 12/2002 | Cheng | |
| 6,512,531 B1 | 1/2003 | Gartland | |
| 6,853,980 B1 | 2/2005 | Ying et al. | |
| 6,856,317 B2 | 2/2005 | Konsella et al. | |
| 7,707,497 B1 | 4/2010 | Patel | |

(Continued)

OTHER PUBLICATIONS

"Extensis(TM) SuitcaseFusion(TM) 5 User Guide for Windows", Celartem, Inc., retreived from http://doc.extensis.com/Suitcase-Fusion-5-User-Guide-Windows.pdf, (2013).

(Continued)

Primary Examiner — Kyle R Stork
(74) Attorney, Agent, or Firm — Finch & Maloney PLLC

(57) ABSTRACT

Techniques for performing font management on a client allowing the client to dynamically determine operating system support for new technology fonts, and upon an affirmative such determination perform installation and activation of those new technology fonts. At least one stub font and a new technology font test process facilitate activation/installation of selected fonts if the operating system supports them and graceful exception handling if the operating system does not. A stub font can be thought of as a simplified or otherwise light-weight representation of a real font (a stub font is a proxy for a real font). The stub font can be efficiently stored on a client machine, so that a new technology font test can attempt to activate the corresponding stub font in order to test whether a corresponding real font is supported by the operating system. Successful stub font activation means the selected real font is supported by the target machine and that the selected real font can therefore be provisioned to the client machine.

20 Claims, 7 Drawing Sheets

(56) References Cited

U.S. PATENT DOCUMENTS

| | | |
|---|---|---|
| 8,331,681 B1 | 12/2012 | Lorenz et al. |
| 8,718,369 B1 | 5/2014 | Tompkins et al. |
| 9,148,494 B1* | 9/2015 | Tiberi .................... H04L 67/42 |
| 9,465,776 B2 | 10/2016 | Furman et al. |
| 2005/0034119 A1 | 2/2005 | Koyama et al. |
| 2005/0091250 A1 | 4/2005 | Dunn et al. |
| 2005/0107998 A1 | 5/2005 | McLernon et al. |
| 2006/0238539 A1 | 10/2006 | Opstad |
| 2007/0242072 A1 | 10/2007 | Fattic, II et al. |
| 2008/0079730 A1 | 4/2008 | Zhang et al. |
| 2008/0155495 A1 | 6/2008 | Van Wyk et al. |
| 2008/0303822 A1 | 12/2008 | Taylor et al. |
| 2010/0217750 A1 | 8/2010 | Tokoro et al. |
| 2010/0275161 A1 | 10/2010 | Dicamillo et al. |
| 2011/0119462 A1 | 5/2011 | Leach et al. |
| 2011/0126191 A1* | 5/2011 | Hughes .................... G06F 8/61 717/178 |
| 2011/0271180 A1 | 11/2011 | Lee |
| 2012/0054231 A1 | 3/2012 | Fu et al. |
| 2012/0311473 A1 | 12/2012 | Nolterieke et al. |
| 2013/0232229 A1 | 9/2013 | Firman et al. |
| 2014/0115435 A1 | 4/2014 | Elseth et al. |
| 2015/0097842 A1 | 4/2015 | Kaasila et al. |
| 2015/0234793 A1 | 8/2015 | Patel |
| 2017/0344519 A1* | 11/2017 | Scott .................... G06F 3/0484 |

OTHER PUBLICATIONS

"Font Management in OS X Best Practices Guide", Celartem, Inc, retreived from http://doc.extensis.com/Font-Management-in-OSX-Best-Practices-Guide.pdf, (2012).

"Typeface," Wikipedia, the free encyclopedia, downloaded from Internet at URL: "http://en.wikipedia.org/wiki/Typeface", on Oct. 8, 2013, 14 pages.

\* cited by examiner

OS activation support test results for variable fonts (CFF2 and TrueType)

Activating the font file via OS API calls (done by LiveType) was tested on all OSes that Thor supports for MAX 2017. Here, success indicates only that activation succeeded and the font appears in Thor's Fonts panel without any indication of error.

| | CFF2-only font | CFF2+CFF font | TT variable font |
|---|---|---|---|
| Mac OS 10.10 | Fails | Succeed | Succeeds |
| Mac OS 10.11 | Fails | Succeeds | Succeeds |
| Mac OS 10.12 | Fails | Succeeds | Succeeds |
| Win 8 | Fails | Fails | Succeeds |
| Win 10 v 1607 (Redstone 1) | Fails | Fails | Succeeds |
| Win 10 v 1703 (Redstone 2) | Fails | Fails | Succeeds |
| Win 10 v TBD (Redstone 3) | | | |

FIG. 2

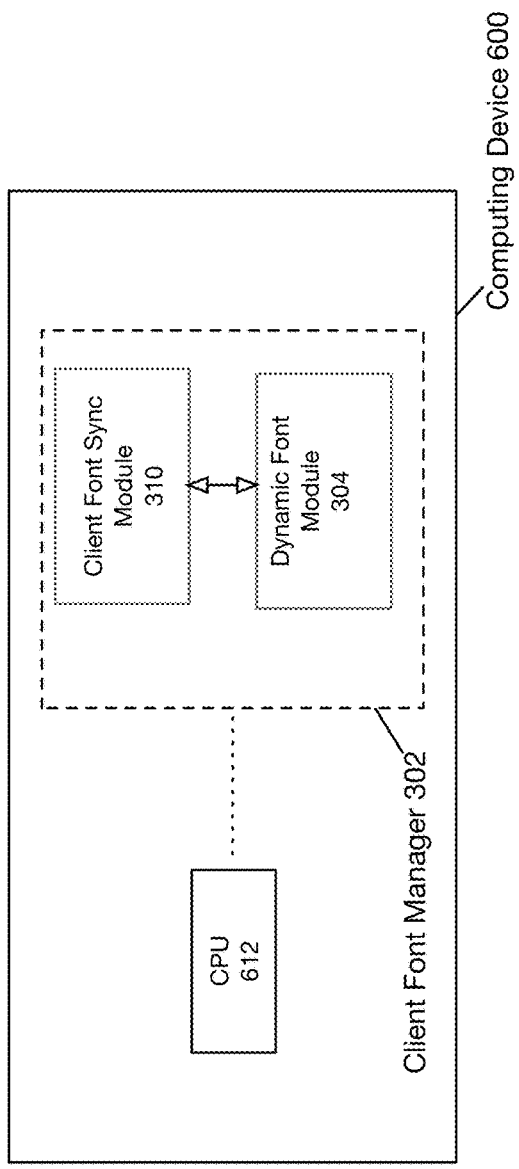

DEPLOYING NEW FONT TECHNOLOGIES TO LEGACY OPERATING SYSTEMS

FIELD OF THE DISCLOSURE

This disclosure relates to techniques and systems for managing fonts and font technologies on user devices having an operating system.

BACKGROUND

New font technologies such as variable fonts and OpenType-SVG are being added to the font standards. These technologies extend a font's capabilities in valuable ways such as interpolatable axes for typographic styles such as weight and width or enabling the expression of multiple colors or gradients with a glyph. Foundries are creating fonts utilizing these new technologies. In addition, mobile and desktop applications are adding support for these new technologies.

OpenType is a format for scalable computer fonts and is one of the most popular font specifications. It was built on its predecessor TrueType, retaining TrueType's basic structure and adding many intricate data structures for prescribing typographic behavior. Because of wide availability and typographic flexibility, including provisions for handling the diverse behaviors of all the world's writing systems, OpenType fonts are used commonly today on major computer platforms.

OpenType comes in two flavors, TrueType (.ttf file extension) and OpenTypeCFF (.otf file extension). Font formats such as OpenType specify how a font file such as Arial.ttf ("True Type Format") or Helvetica.otf ("OpenType Font Format") should appear on a device as well as the format of the bits and tables within that file. Ideally, the same font file on any operating system should behave identically because the operating system ("OS") should know how to read the file format.

In the last several years, two new ways of specifying glyph outlines have been added to the OpenType standard. One addition was SVG ("Scalable Vector Graphics") glyphs, which allow for a glyph in an OpenType font to include multiple colors. In addition, a technology referred to as variable fonts allows a user to edit fonts to define a desired weight or width. In other words, variable fonts allow the interpolation of aspects of fonts such as the font characters' weight (for example, exactly how bold or light it looks). Previously, a font could only be presented in fixed variation such as bold or italics.

Modern font management and licensing models, which are typically cloud-based, may be predicated on a downloaded licensed font being stored in a secret location on disk not visible to the casual user. In this scenario, users may employ a font sync technology that allows them to download and synchronize desired fonts from a cloud based server. These licensing models typically require fonts to be activated via an operating system application programming interface (OS API) call on the client to enable an application that enumerates OS fonts to "see" or gain access to the selected or desired font. Such an OS API activation call will fail if the OS doesn't yet support the new font technology.

Therefore, a significant and unresolved problem is how to start deploying new font technologies across heterogeneous operating systems that may or may not support a particular font technology.

BRIEF DESCRIPTION OF THE DRAWINGS

FIG. 2 is a table illustrating an example of font technologies and their associated support on various operating systems according to one embodiment of the present disclosure.

FIG. 6a illustrates an example computing system that executes a client font management process in accordance with some embodiments of the present disclosure.

DETAILED DESCRIPTION

Figure 1:
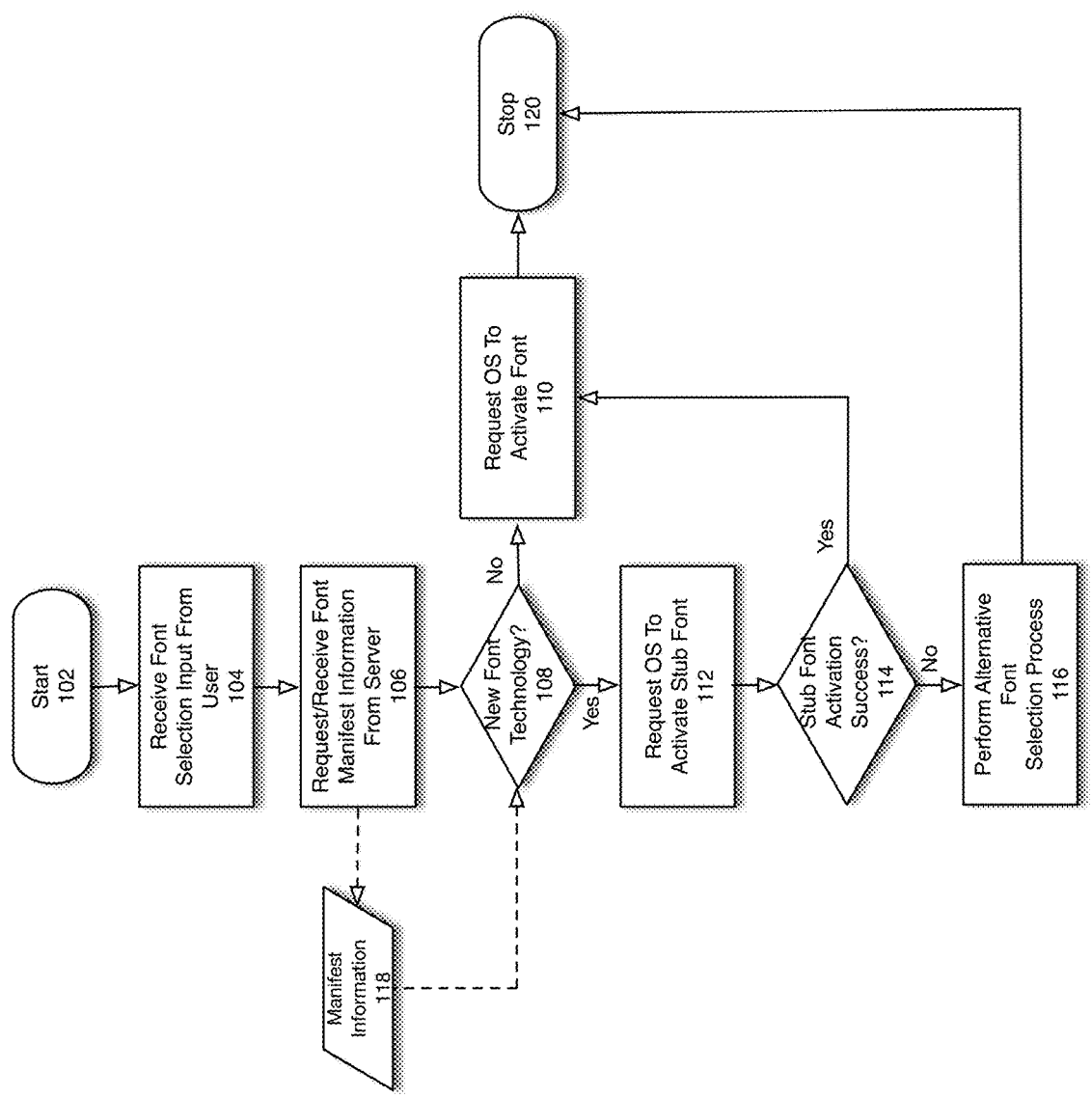
FIG. 1 is a flowchart of a dynamic font management process according to one embodiment of the present disclosure.

Techniques for performing font management on a client allowing the client to dynamically determine operating system support for new technology fonts, and upon an affirmative such determination perform installation and activation of those new technology fonts. At least one stub font and a new technology font test process facilitate activation/installation of selected fonts if the operating system supports them and graceful exception handling if the operating system does not. A stub font can be thought of as a light-weight but otherwise valid representation of a real font (a stub font is a proxy for a real font). The stub font can be efficiently stored on the client device, so that a new technology font test can attempt to activate the corresponding stub font. A successful stub font activation indicates that a selected real font is supported on the client and that selected real font can therefore be provisioned (i.e., installed and activated) on the client.

General Overview

As previously noted, there are significant shortcomings associated with performing font management. In particular, font activation failure is often the case for new font technologies such as variable fonts as they are not generally understood by existing operating systems and in particular legacy operating systems. In order to enable the use of new technology fonts, the ecosystem surrounding these new technology fonts requires modification and updating. And, in general, for each new font technology that may be introduced, a corresponding modification is required in the OS to support its use. If a font is not available and an attempt to activate it performed when it is not supported by the OS, the OS APIs fail by either returning an exception or via some non-graceful failure mechanism.

Delivery mechanisms such as bundling/embedding fonts in particular apps does not solve the problem because it is difficult to update fonts to the latest version. In addition, this type of solution requires a duplicate payload in each support app and introduces issues regarding licensing. A hardcoded table provides one potential solution, but not without significant shortcomings. In more detail, a font manager running on the client could consult the hardcoded table to determine whether a particular font technology is supported or not. However, this type of solution fails to synchronize with OS updates and patches. For example, assume originally an OS did not support a particular font but a later a patch was generated for the OS that allowed the OS to support that font. In this instance, the hardcoded table would need to be updated to reflect the OS update.

As an example of a hard-coded solution, a list of OS versions and technologies may be stored in a desktop font manager. This type of solution might utilize a hardcoded set of rules such as "Windows v. 1607 does not support CFF variable fonts, but does support TrueType variable fonts and does not support OT-SVG fonts." However, this type of solution is brittle and will generally fail to scale or properly dynamically synchronize changing OS capabilities. Thus, current font management/delivery mechanisms will often fail in delivering and synchronizing new font technologies to support applications because of an intermediate broken link or supporting infrastructure in the OS. Thus, techniques are needed to obviate tedious, error-prone, brittle approaches such as relying on unwieldy tables or rules indicating font support across operating systems.

To this end, and according to an embodiment of the present disclosure, one or more stub fonts are maintained on the client. A stub font effectively acts a simplified proxy for a corresponding more complex real font and may comprise, for example, a font containing a single character such as a space. As noted, each stub font corresponds to a real font, which is a new technology font (i.e., the real font may not be supported on some client operating systems but supported on others). Further, each of the stub fonts may be stored on or otherwise be accessible to a client and the corresponding real font may be maintained on a server and made available for download and activation at the client if it is determined that the client OS supports the new technology font based upon a new technology font test that utilizes the corresponding stub font.

In particular, upon receiving a request to download and/or install a font, a dynamic font module may perform a new technology font test utilizing a stub font to transparently determine whether the selected font is supported by the client OS. According to one embodiment of the present disclosure, the client may consult manifest information, which in some example embodiments is downloaded from the same server storing the real fonts, the manifest information indicating whether the selected font is a new technology font. Based upon this manifest information indicating whether the selected font is a new technology font, which may be signified by a flag in the manifest information in some embodiments, the dynamic font module may perform a new technology font test by attempting to activate the corresponding stub font. If the new technology font test is successful indicating that the client OS supports the selected font, the corresponding real font may be downloaded and installed from the server. If the new technology font test is not successful, a graceful exception process may be performed such as downloading and/or installing an alternative font and/or presenting a user with messaging indicating the failure to activate/download the selected font.

For purposes of this discussion, the term "new technology font" will be used to refer to any font that may or may not be supported by an operating system, but is currently not installed or otherwise active on the machine on which the operating system is installed or active. In particular, as described above, legacy operating systems may not support certain new technology fonts. Further, for purposes of this discussion, a distinction is made between the terms "font" or "real font" and stub font. Thus, throughout this discussion, the terms "font" and "real font" are used interchangeably as distinguished from a "stub font", which can be thought of as a simplified or otherwise light-weight representation of the real font, or simply a proxy, as will be further described below. The stub font can be efficiently stored on a client device, so that a new technology font test can be performed when a corresponding real font is selected for activation/installation. An attempt to activate the stub font corresponding to the real font may then be performed, with successful activation meaning the real font is supported and can therefore be provisioned to the target machine. Unsuccessful activation on the other hand, means that the real font is not supported on the client and therefore an alternative process should be performed such as a simple notification or attempt to activate/install a different font.

Methodology

FIG. 1 is a flowchart of a dynamic font management process according to one embodiment of the present disclosure. The process shown in FIG. 1 may be performed by a dynamic font module (described below). It is assumed that a user on a client device desires to install and/or activate a new font for use on the device. Client devices may include desktop computers, mobile devices such as Smartphones, tablets, etc. It is further assumed that the desired font(s) to be installed or activated reside on a server, which may be cloud-based. Alternatively, the server may be collocated with the client on the same LAN or even running as a local process on the client.

The process is initiated in 102. In 104, a selected font input is received from a user. It is assumed that a user may utilize a user interface to indicate a particular selected font. User interfaces may include UI' s generated programmatically that run natively on the client, a Web browser, etc. The font selection input may comprise an identifier indicating a desired font to be installed or activated. In 106, based upon the user input received in 104, manifest information 118 regarding the desired font to be installed or activated may be requested and received from a server. As will be described below, to communicate with the server, the client may run a client font synchronization module that communicates with a server font synchronization module to allow the exchange of information and files such as fonts and manifest information 118.

According to one embodiment, manifest information 118 may not be directly requested by the client, but instead, the server may provide the information based upon the client requesting a selected font. According to another embodiment, manifest information 118 may be retrieved from a different server than the one storing the fonts.

As will be described below, manifest information 118 may contain a flag that indicates whether a requested font is a new technology font, which is detected in 108. If the flag is not set ('No' branch of 108), in 108, a request may be provided to the client OS to activate the font. This is acceptable because in this case the font technology is not new and therefore a call to the OS to activate the font should be successful. The process the ends in 120.

If the flag is set ('Yes' branch of 108), in 112, a request is made to the client OS to attempt to activate a stub font. The structure and function of a stub font will be described below. In 114, it is determined whether the stub font activation is successful. As the stub fonts serve as a proxy for the real new technology font and may reside in and be controlled by a dynamic font module, the success or failure of activation may be easily detected and controlled.

If the stub activation is successful ('Yes' branch of 114), in 110, a request may be made to the client OS to activate the real new technology font corresponding to the stub font.

If not ('No' branch of 116), an alternative font selection process is performed. Examples of an alternative font selection process are described below. The process then ends in 120.

FIG. 2 is a table illustrating an example of font technologies and their associated support on various operating systems according to one embodiment of the present disclosure. As shown in FIG. 2, a CFF2-only font is not supported for any operating systems shown in the table. However, a CFF2+CFF font is supported in MacOS but not in Windows OS. On the other hand, a TT variable font is supported in all operating systems. This table illustrates in a concrete manner the types of issues that may arise across current and legacy operating systems regarding support for new font technologies. If such a table were required to be updated based upon OS patches and releases it would create an intractable scenario for effectively managing font technology support across a range of operating systems.

System Architecture

Figure 3:
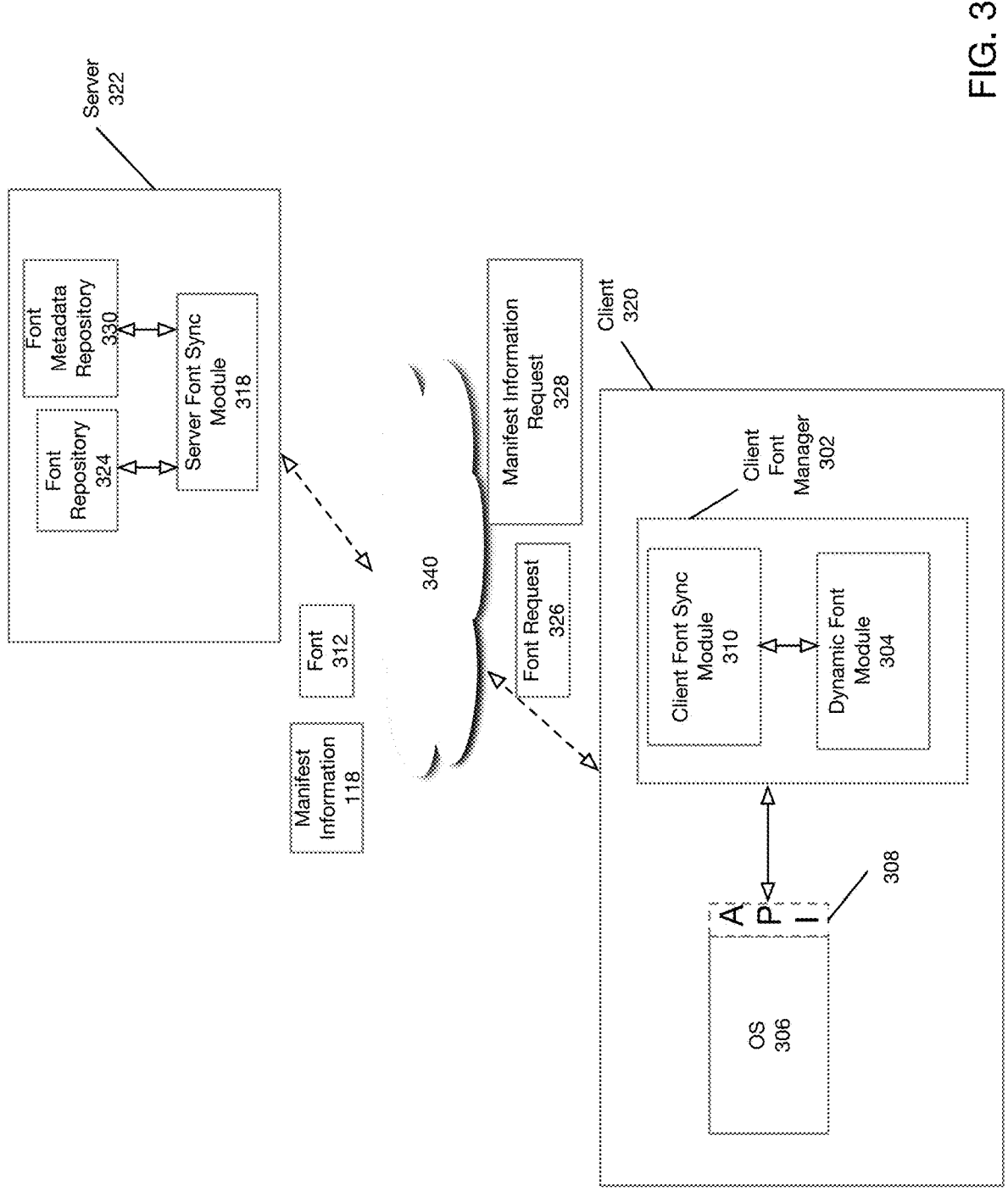
FIG. 3 is a block diagram illustrating an operation of a dynamic font module in the context of a client and server font synchronization process according to one embodiment of the present disclosure.

FIG. 3 is a block diagram illustrating an operation of a dynamic font module in the context of a client and server font synchronization process according to one embodiment of the present disclosure. A user of client 320 may desire to install or utilize various fonts (e.g., 312) stored in font repository 324 on server 322.

Client 320 may be any type of fixed or mobile client such as a desktop computer, workstation, mobile client such as a Smartphone, etc. Client 320 may further comprise OS 306, OS API ("Application Programming Interface") 308 and client font manager 302. OS 306 may be any operating system that is capable of running on client 320. OS 306 may also run in a virtual environment. OS API 308 provides an interface for accessing OS 306 services and functionality.

According to one embodiment of the present disclosure, client font manager 302 may provide functionality for synchronizing, downloading and managing fonts including fonts (e.g., 312) from server 322. In particular, as shown in FIG. 3, client font sync module 310 may perform synchronization and downloading of fonts from server 322. Dynamic font module 304 may perform a myriad of services including but not limited to new font technology management services as described below.

As shown in FIG. 3, client font manager 302 may further comprise client font sync module 310 and dynamic font module 304. As will be described below, the structure of client font manager 302 shown in FIG. 3 is only one particular example and other embodiments are possible. For example, according to alternative embodiments of the present disclosure, client font sync module 310 and dynamic font module 304 may be combined into a single element. In yet other embodiments, client font manager 302 may be integrated with OS 306 or may not even run on client 320 but, for example, run on a remote device or server. These implementation details are not germane to the essence of the functional operation of client font manager 302 and in particular dynamic font module 304 and client font sync module 310.

According to the embodiment shown in FIG. 3, client font sync module 310 may communicate with dynamic font module 304. For example, both client font sync module 310 and dynamic font module 304 may each have a respective public API through which operations and requests may be performed. According to some embodiments of the present disclosure, client font sync module 310 and dynamic font module 304 may be dynamic or static libraries that are integrated into client font manager 302.

Server 322 may further comprise server font sync module 318, font repository 324 and font metadata repository 330. As shown in FIG. 3, server font sync module 318 may communicate with both font repository 324 and font metadata repository 330 via, for example, a public API. Font repository 324 on server 322 may store fonts (e.g., 312) for download and installation on client 320. Some of these fonts may be new technology fonts. Font metadata repository 330 may store information regarding fonts (e.g., 312), indicating, for example, whether a font (e.g., 312) is a new technology font. Server font sync module 318 may perform services for font synchronization based on requests from client 320 and as shown in FIG. 3 may communicate with font repository 324 in order to retrieve fonts and prepare them for download.

According to one embodiment of the present disclosure, client 320 and server 322 may communicate via network 340 and respective client font sync module 310 and server font sync module 318 to download and install particular fonts (e.g., 312), which may be new technology fonts. Network 340 may be any type of public or private network including the Internet and World Wide Web. Font 312 may comprise any type of font file including, for example, a TTF (TrueType font). An example format for a TTF is described below.

Manifest information 118 may provide information relating to fonts 312 downloaded and synchronized between client 320 and server 322. In particular, when client 320 requests a particular font (e.g., 312) for installation from server 322, server 322 via server font sync module 318 may first transmit manifest information 118 to client 320 rather than font 312 itself. According to one embodiment of the present disclosure, server font sync module 318 may generate manifest information 118 based upon font metadata stored in font metadata repository 330. According to other embodiments of the present disclosure, client font sync module 310 may provide logic on client 320 for requesting manifest information 118 prior to requesting font 312 from server 322. Among other things, manifest information 118 may include a respective flag for some set of fonts (e.g., 312) indicating whether that font is a new technology font.

According to one embodiment of the present disclosure, server font sync module 318 coordinates with client sync module 310 in client font manager 302 to handle requests to install fonts such as font 312 on client 320 based upon font request 326 issued by client font manager 302.

However, according to one embodiment of the present disclosure, before a new technology font is downloaded and installed, as it may or may not be supported on OS 306, dynamic font module 304 may perform a new technology font test to determine whether font 312 is supported on OS 306. As will be described below, before installing font 312 on client 320, client font manager 302 may first request manifest information 118 from server 322 via manifest information request 328. As will be described below, manifest information 118 may provide among other things information regarding whether font 312 is a new technology font. According to one embodiment of the present disclosure, server 322 may automatically transmit manifest information 118 to client 320 upon receipt of a font request 326. Thus, manifest information request 328 may or may not be performed.

If manifest information 118 received at client 302 from server 322 indicates that font 312 is a new technology font, dynamic font module 304 may then run a new technology font test (described below) to determine whether font 312 is supported on OS 306. Depending on whether OS 306 is capable of supporting font 312, dynamic font module 304 may either request that client font sync module 310 proceed to download font 312. Alternatively, if font 312 is not supported on OS 306, dynamic font module 304 may request that client font sync module 310 perform another operation such as installing a different font or providing a notification to a user or both.

If font 312 is supported on OS 306, client font manager 302 may cause font 312 to be downloaded to client 320 and stored on client 320 possibly in a secret location. Client font sync module 310 may then call OS API 308 to cause downloaded font 312 to become accessible and available in client applications.

Figure 4:
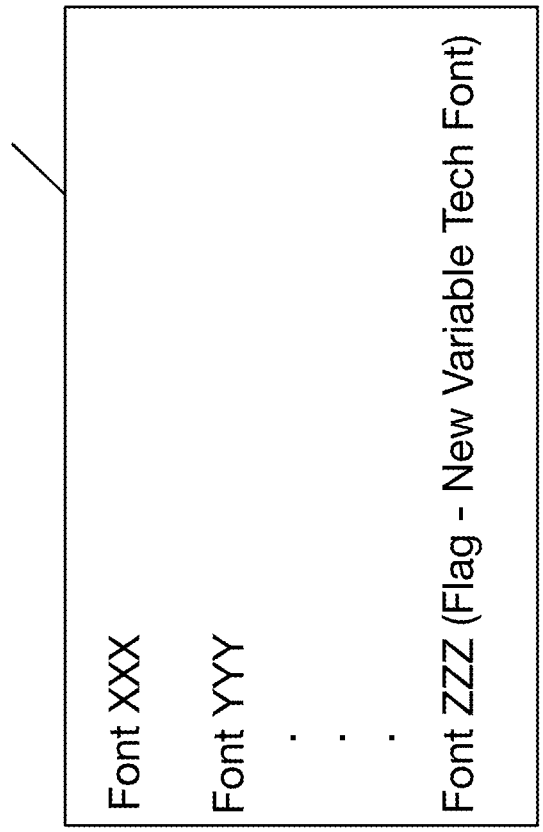
FIG. 4 illustrates a format for a manifest information according to one embodiment of the present disclosure.

FIG. 4 illustrates a format for a manifest information according to one embodiment of the present disclosure. As shown in FIG. 4, manifest information 118 may provide information regarding a plurality of fonts. According to alternative embodiments, manifest information 118 may provide information regarding only a single font. As shown in FIG. 4, manifest information 118 may comprise a set of entries respectively corresponding to particular fonts providing information regarding those fonts. According to one embodiment of the present disclosure, among other information, each entry corresponding to a font may comprise a flag indicating whether the particular font is a new technology font. Thus, as shown in FIG. 4, fonts XXX and YYY are not new technology fonts, while font ZZZ is a new technology font.

Utilizing manifest information 118 such as the example one shown in FIG. 4, provides significant flexibility. Manifest information 118 may be organized according to particular font technologies such as SVG or variable fonts, CFF only, CFF2 only or TrueType. An associated flag for each font flavor may then indicate whether the associated technology type is supported by OS 306. That is, according to embodiments of the present disclosure, a new font technology flag may be stored for each flavor of new font technology (e.g., one for OT-SVG, one for CFF2 variable font, etc.). This allows the use of a stub font as a proxy for the real font in testing whether the real font is supported by the OS.

As previously described, server font sync module 318 may generate manifest information 118 by analyzing data retrieved from font metadata repository 330. In particular, according to one embodiment of the present disclosure, upon receiving a request for a particular font 312, server font sync module 318 may query font metadata repository 330 for metadata corresponding to the requested font 312, which among other things may include information relating to whether the font is a new technology font. Server font sync module 318 may then assemble that information into manifest information 118 for transmission to client 320. According to one embodiment of the present disclosure, client 320 via client font sync module 310 may directly request manifest information 118 itself via manifest information request 328.

Figure 5:
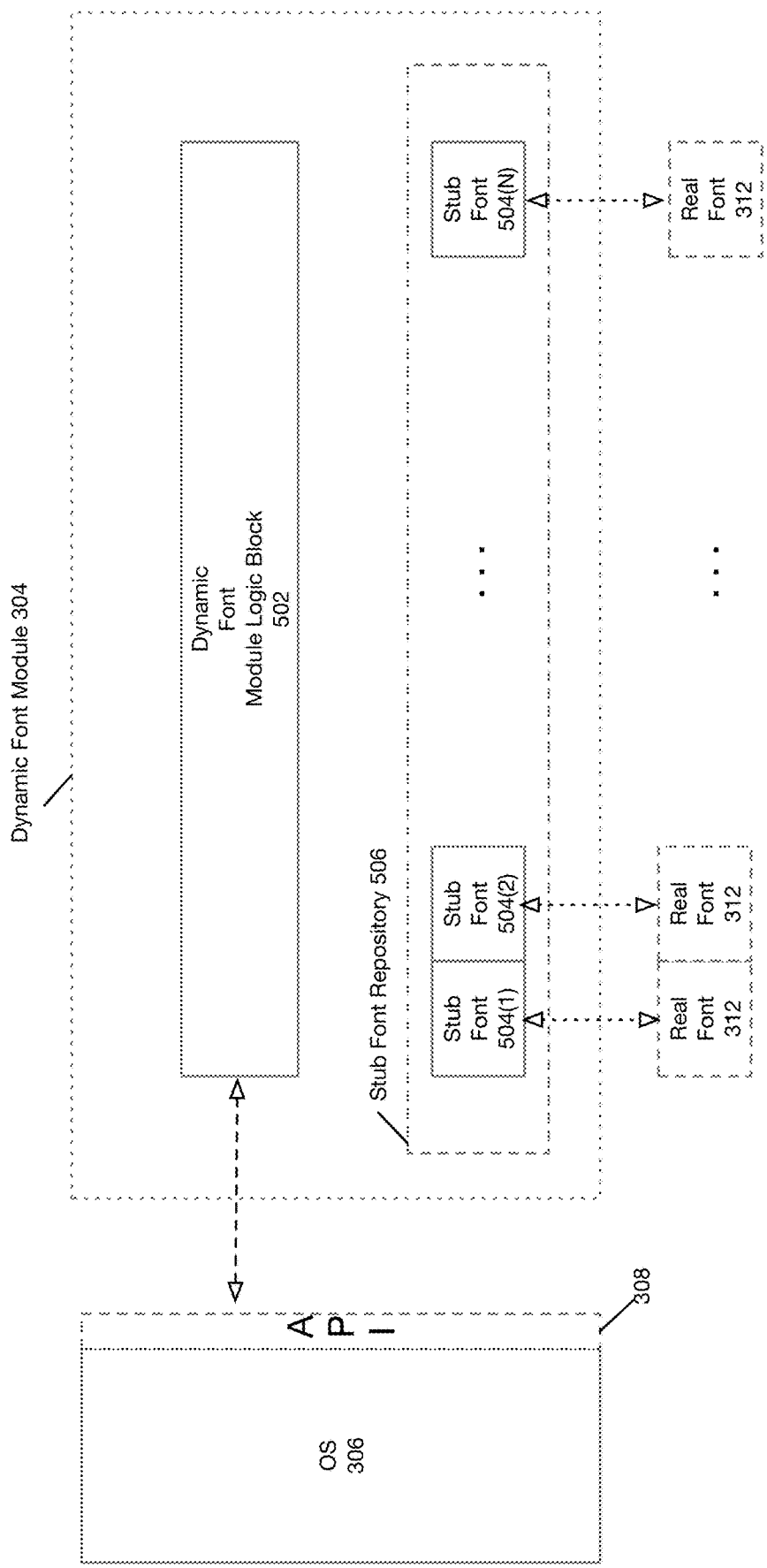
FIG. 5 is a block diagram of a dynamic font module according to one embodiment of the present disclosure.

FIG. 5 is a block diagram of a dynamic font module according to one embodiment of the present disclosure. As shown in FIG. 5, dynamic font module 304 may further comprise dynamic font module logic block 502, and stub font repository 506. According to one embodiment of the present disclosure, dynamic font module logic block 502 may perform a dynamic font management process such as that shown in FIG. 1. In particular, dynamic font module logic block 502 may comprise instructions and data for testing whether a particular font 312 requested to be installed on client 320 is in fact supported by OS 306.

Stub font repository 506 may store any number of stub fonts 504(1)-504(N). As previously described, a stub font 504 may be similar to a standard font 312 in format and content. However, typically it may only include data for a single character such as a space character. According to one embodiment of the present disclosure, stub fonts 504(1)-504(N) are very small fonts that may contain, for example, only a single character such as a space. As a particular stub font 504 does not need to be seen by humans, it need only include a small subset of characters. For example, a particular stub font 504 may be a well-formed OpenType font that doesn't have 100s or 1000s of characters and in fact may only support a space character.

Thus, as shown in FIG. 5, each stub font 504(1)-504(N) may be associated with a corresponding real font 312(1)-312(N) that is a new technology font. As previously described, real fonts 312(1)-312(N) are also referred to in this disclosure using the simple term "font". Real fonts 312(1)-312(N) are actual font files including full data comprising the full set of characters in a font 312 as distinguished from stub fonts 504(1)-504(N), which may contain only a single character such as a space. It should be noted that real fonts 312(1)-312(N) shown in FIG. 5 are not meant to indicate that real fonts 312(1)-312(N) are included in dynamic font module 304. The illustration in FIG. 5 is merely meant to express that each stub font 504(1)-504(N) has a corresponding new technology real font 312(1)-312(N). In particular, according to one embodiment of the present disclosure, a stub font may be stored for each type of new technology. As an example, stub fonts may have names such as:

StubFontTest-SVG
StubFontTest-CFF2

Although there may be many real new technology fonts utilizing these new technologies, only a single stub font needs to be stored for the multitude of real new technology fonts that utilize the new technology. Thus, according to one embodiment of the present disclosure, there is a one-to-many relationship between stub fonts and fonts stored in a cloud font library.

The purpose of stub fonts 504(1)-504(N) is to be utilized as part of a new technology font test to determine whether the respective corresponding real font 312(1)-312(N) is supported by OS 306. The embedded stub fonts 504(1)-504(N) provide several advantages. First, no hardcoded table is needed. Even if a new patch is sent out for an OS to support a font that wasn't previously supported, no hardcoded table need be updated because there is none. Instead dynamic font module 304 may perform a new technology font test using stub fonts 504(1)-504(N). Second, utilizing the previously described new technology font test along with stub fonts 504(1)-504(N) allows complete accessibility via client font manager 302 and obviates the need for updating client font manager 302 to keep up with changes in client OS 306.

According to one embodiment of the present disclosure, each stub font 504(1)-504(N) may be associated with and support one or more new technologies. Thus, as an example, assume that a user desired to install and active real font MinionVariable.otf 312. In this case a stub font 504 which has new font technology corresponding to real font Minion-Variable.otf 312 would have been previously stored in stub font repository 506. However, stub font 504 might only include data for a space character rather than the full character set. When a user requests installation and activation of real font MinionVariable.otf 312, dynamic font module logic block 502 may instead attempt to activate the stub font 504 corresponding to the real font MinionVariable.otf 312 by performing certain API calls via OS API 308 associated with OS 306 to determine whether real font MinionVariable.otf 312 is supported on OS 306. According to one embodiment of the present disclosure, the following OS calls may be performed on Windows and MacOS:

Windows: AddFontResourceEx

MacOS: CTFontManagerRegisterFontsForURL

In this example, both the above API calls take a special parameter value (FR_PRIVATE on Windows, kCTFontManagerScopeProcess on MacOS) to tell the client OS 306 to make the font available only to that process (so as not to confuse any other applications). This allows the dynamic testing of font technology support in OS 306 a sandboxed test.

The format of various font files comprising stub fonts 504(1)-504(N) and corresponding real fonts 312(1)-312(N) is well understood. In particular, according to some embodiments, stub fonts (i.e., 504(1)-504(N)) and correspondingly real fonts 312(1)-312(N)) may be binary files containing a number of tables. Fonts may be scalable which means the glyphs can be displayed at any resolution and any point size. Typically, there exists is a directory of tables at the start of the file. The file may contain only one table of each type, and the type is indicated by a case-sensitive tag.

Stub fonts 504(1)-504(N) and corresponding real fonts 312(1)-312(N) may contain glyphs, which may be described as a set of paths. A path is simply a closed curve specified using points and particular mathematics. For example, a lower case 'i' has two paths, one for the dot and one for the rest of it. The paths are filled with pixels to create the final letter form. This set of paths is called an outline. Another way that a glyph may be specified is in terms of other component glyphs. A glyph may consist of references to other glyphs which may be combined to make the new compound glyph.

In addition to the basic mathematical data that describes each glyph's outlines, the font (i.e., 504(1)-504(N)) and correspondingly real fonts 312(1)-312(N)) may store a set of 'instructions' (called hints) which are executed when the glyph is drawn on screen.

A font 312 may also store a table that is used to convert from an outside encoding (such as Unicode) to internal glyph ids. Fonts (i.e., 504(1)-504(N) and 312(1)-312(N)) may also store other tables indicating metrics, style, weighting, kerning, etc. In addition, each font (i.e., 504(1)-504(N) and 312(1)-312(N)) may also store metadata indicating general font information.

FIG. 6a illustrates an example computing system that executes a client font management process in accordance with embodiments of the present disclosure. As depicted in FIG. 6a, computing device 600 may include CPU 602 and client font manager 302. Client font manager 302 may be understood to be comprise programmatic structures for performing client font management. In particular, CPU 602 may be further configured via programmatic instructions to execute client font manager 302 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 600 can be any stand-alone computing platform, such as a desk top or work station computer, laptop computer, tablet computer, smart phone or personal digital assistant, game console, set-top box, or other suitable computing platform.

Figure 6B:
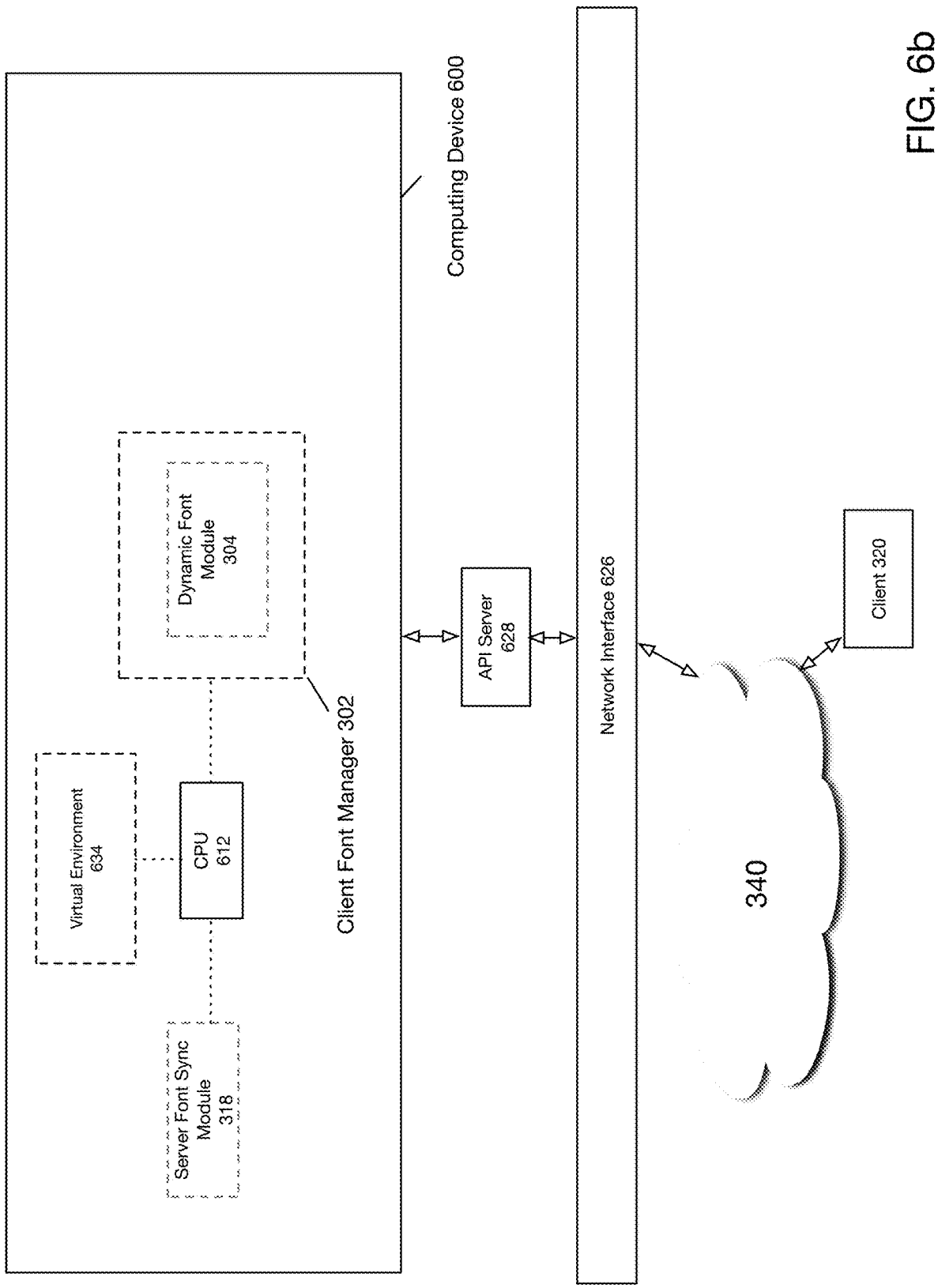
FIG. 6b illustrates an example integration of a client font management system into a network environment according to one embodiment of the present disclosure.

FIG. 6b illustrates an example integration of a client font management system into a network environment according to one embodiment of the present disclosure. As depicted in FIG. 6b, computing device 600 may be collocated in a cloud environment, data center, local area network ("LAN") etc. Computing device 600 shown in FIG. 6b is structured identically to the example embodiment described with respect to FIG. 6a with the addition that computing device 600 in FIG. 6b further may run server font sync module 318 as previously described in this disclosure. In addition, CPU 612 may also execute a virtual environment 634 in which it many simulate various operating systems that may run on client 320. In this scenario, dynamic font module 304 operates in a cloud environment using virtual environment 634 to virtually run various operating systems that may execute on client 320. In this scenario, client font manager 302 utilizing dynamic font module 304 and virtual environment may perform a new technology font test in the cloud. In this instance, computing device 600 may be a server or server cluster, for example. As shown in FIG. 6b, client 320 may interact with computing device 600 via network 340. In particular, client 320 may make requests and receive responses via API calls received at API server 628, which are transmitted via network 340 and network interface 626. It will be understood that network 340 may comprise any type of public or private network including the Internet or LAN.

It will be further readily understood that network 340 may comprise any type of public and/or private network including the Internet, LANs, WAN, or some combination of such networks. In this example case, computing device 600 is a server computer, and client 320 can be any typical personal computing platform As will be further appreciated, computing device 600, whether the one shown in FIG. 6a or 6b, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for deploying a font on an operating system comprising receiving a font selection parameter identifying a selected font, receiving manifest information wherein said manifest information further comprises a flag indicating whether said selected font comprises a new technology font, if said flag is set, causing said operating system to attempt to activate a stub font of new technology, and, if activation of said stub font is successful, making said new technology font corresponding to said stub font available to said operating system.

Example 2 is the method of Example 1, further comprising if activation of said stub font is not successful, initiating an alternative font selection process.

Example 3 is the method of Example 1, wherein said manifest information includes information relating to a plurality of fonts including said selected font.

Example 4 is the method of Example 1, further comprising if activation of said stub font is not successful, displaying an alert indicating that said new technology font is not supported.

Example 5 is the method of Example 1, wherein said stub font includes information for a single character only.

Example 6 is the method of Example 5, wherein said single character is a space character.

Example 7 is the method of Example 1, wherein causing said operating system to attempt to activate said stub font comprises performing an API call provided by said operating system to activate said stub font.

Example 8 is the method of Example 1, wherein making said new technology font corresponding to said stub font available to said operating system comprises at least one of initiating a download of said new technology font, and, installing said new technology font.

Example 9 is a client font manager comprising one or more processors, a dynamic font module executable by said one or more processors, wherein said dynamic font module comprises one or more stub fonts each corresponding to a new font technology, and dynamic font module is adapted to receive manifest information for a selected font, wherein said manifest information comprises a flag indicating whether said selected font is a new technology font, if said flag is set, causing said operating system to attempt to activate said corresponding stub font, and, a client font synchronization module executable by said one or more processors, wherein said client synchronization module, upon successful activation of said corresponding stub font, causes said new technology font to be downloaded.

Example 10 is the client font manager of Example 9, wherein if activation of said stub font is not successful, said dynamic font module initiates an alternative font selection process.

Example 11 is the client font manager of Example 9, wherein said manifest information includes information relating to a plurality of fonts including said selected font.

Example 12 is the client font manager of Example 9, wherein if activation of said stub font is not successful, said dynamic font module causes the displaying of an alert indicating that said new technology font is not supported.

Example 13 is the client font manager of Example 9, wherein said stub font includes information for a single character only.

Example 14 is the client font manager of Example 13, wherein said single character is a space character.

Example 15 is a computer program product including one or more non-transitory machine-readable mediums encoded with instructions that when executed by one or more processors cause a process to be carried out for performing client font management, said process comprising receiving a font selection parameter identifying a selected font, receiving manifest information for said selected font wherein said manifest information comprises an indication whether said selected font is a new technology font, if said indication is affirmative, causing said operating system to attempt to activate a stub font corresponding to said new technology font, and, if activation of said stub font is successful, making said new technology font corresponding to said stub font available to said operating system.

Example 16 is the computer program of Example 15, said process further comprising if activation of said stub font is not successful, initiating an alternative font selection process.

Example 17 is the computer program product of Example 15, wherein said manifest information includes information relating to a plurality of fonts including said selected font.

Example 18 is the computer program product of Example 15, said process further comprising if activation of said stub font is not successful, displaying an alert indicating that said new technology font is not supported.

Example 19 is the computer program product of Example 15, wherein said stub font includes information for a single character only.

Example 20 is the computer program product of Example 19, wherein said single character is a space character.

What is claimed is:

1. A method for deploying a font on an operating system, the method comprising:
   receiving, at a client device executing an operating system, a font selection parameter identifying a selected font;
   receiving, at the client device, from a networked server, manifest information wherein said manifest information further comprises a flag indicating whether said selected font comprises a new technology font, and wherein successful activation of the new technology font requires that the operating system provide certain baseline functionality;
   making a first determination that the flag is set, and in response to making the first determination, (a) identifying a stub font that represents functionality provided by the new technology font and that is stored in a stub font repository hosted at the client device, and (b) causing the operating system to attempt to activate the identified stub font; and
   making a second determination that said stub font is successfully activated, and in response to making the second determination, causing the operating system to (a) download the new technology font from the networked server and (b) activate the new technology font,
   wherein the operating system attempts to activate the stub font before downloading the corresponding new technology font from the networked server.

2. The method according to claim 1, further comprising:
   receiving, at the client device, a second font selection parameter identifying a second font, wherein the manifest information further comprises a second flag indicating that successful activation of the second font requires that the operating system provide certain baseline functionality;
   making a third determination that the second flag is set, and in response to making the third determination, (a) identifying a second stub font that represents functionality provided by the second font and that is stored in the stub font repository hosted at the client device, and (b) causing the operating system to attempt to activate the identified second stub font; and
   making a fourth determination that the second stub font is not successfully activated, and in response to making the fourth determination, initiating an alternative font selection process.

3. The method according to claim 1, wherein said manifest information includes information relating to a plurality of fonts including said selected font.

4. The method according to claim 1, further comprising:
   receiving, at the client device, a second font selection parameter identifying a second font, wherein the manifest information further comprises a second flag indicating that successful activation of the second font requires that the operating system provide certain baseline functionality;
   making a third determination that the second flag is set, and in response to making the third determination, (a) identifying a second stub font that represents functionality provided by the second font and that is stored in the stub font repository hosted at the client device, and (b) causing the operating system to attempt to activate the identified second stub font; and
   making a fourth determination that the second stub font is not successfully activated, and in response to making the fourth determination, displaying an alert indicating that the second font is not supported.

5. The method according to claim 1, wherein said stub font includes information for a single character only.

6. The method according to claim 5, wherein said single character is a space character.

7. The method according to claim 1, wherein causing said operating system to attempt to activate said stub font comprises performing an API call provided by said operating system to activate said stub font.

8. The method according to claim 1, further comprising, in response to making the second determination, causing the operating system to install the new technology font.

9. A client font manager comprising:
   one or more processors configured to execute an operating system at a client device;
   a dynamic font module executable by said one or more processors at the client device, wherein said dynamic font module comprises one or more stub fonts each corresponding to a new font technology, and wherein the dynamic font module is adapted to
      receive, from a networked server, manifest information for a selected font, wherein said manifest information comprises a flag indicating whether said selected font is a new technology font, and wherein successful activation of the new technology font requires that the operating system provide certain baseline functionality, and
      make a first determination that the flag is set, and in response to making the first determination, (a) identifying a particular stub font that represents representing functionality provided by the new technology font and that is included in the dynamic font module, and (b) causing the operating system to attempt to activate the particular stub font; and
   a client font synchronization module executable by said one or more processors, wherein said client synchronization module is adapted to make a second determination that the particular stub font is successfully activated, and in response to making the second determination, further cause the operating system to (a) download the new technology font from the networked server, and (b) activate the new technology font,
   wherein the operating system attempts to activate the particular stub font before downloading the corresponding new technology font from the networked server.

10. The client font manager according to claim 9, wherein:
    the manifest information further comprises a second flag indicating whether a second font requires that the operating system provide certain baseline functionality;
    the dynamic font module is further adapted to make a third determination that the second flag is set, and in response to making the third determination, identify a second particular stub font that represents functionality provided by the second font and that is included in the dynamic font module, and (b) causing the operating system to attempt to activate the second particular stub font; and
    the client font synchronization module is further adapted to make a fourth determination that the second particular stub font is not successfully activated, and in response to making the fourth determination, further cause said dynamic font module to initiate an alternative font selection process.

11. The client font manager according to claim 9, wherein said manifest information includes information relating to a plurality of fonts including said selected font.

12. The client font manager according to claim 9, wherein:
  the manifest information further comprises a second flag indicating whether a second font requires that the operating system provide certain baseline functionality;
  the dynamic font module is further adapted to make a third determination that the second flag is set, and in response to making the third determination, (a) identify a second particular stub font that represents functionality provided by the second font and that is included in the dynamic font module, and (b) causing the operating system to attempt to activate the second particular stub font; and
  the client font synchronization module is further adapted to make a fourth determination that the second particular stub font is not successfully activated, and in response to making the fourth determination, further cause said dynamic font module to display an alert indicating that the second font is not supported.

13. The client font manager according to claim 9, wherein said particular stub font includes information for a single character only.

14. The client font manager according to claim 13, wherein said single character is a space character.

15. A computer program product including one or more non-transitory machine-readable mediums encoded with instructions that when executed by one or more processors cause a process to be carried out for performing client font management, said process comprising:
  receiving, at a client device executing an operating system, a font selection parameter identifying a selected font;
  receiving manifest information for said selected font wherein said manifest information comprises an indication whether said selected font is a new technology font, and wherein successful activation of the new technology font requires that the operating system provide certain baseline functionality;
  making a first determination that the indication is affirmative, and in response to making the first determination, causing said operating system to attempt to activate a stub font representing functionality provided by the new technology font; and
  making a second determination that said stub font is successfully activated, and in response to making the second determination, causing the operating system to activate the new technology font,
  wherein the stub font includes information for a single character only, and wherein the single character is a space character.

16. The computer program product according to claim 15, said process further comprising:
  receiving, at the client device, a second font selection parameter identifying a second font, wherein the manifest information further comprises a second indication whether successful activation of the second font requires that the operating system provide certain baseline functionality;
  making a third determination that the second indication is affirmative, and in response to making the third determination, causing the operating system to attempt to activate a second stub font representing functionality provided by the second font; and
  making a fourth determination that the second stub font is not successfully activated, and in response to making the fourth determination, initiating an alternative font selection process.

17. The computer program product according to claim 15, wherein said manifest information includes information relating to a plurality of fonts including said selected font.

18. The computer program product according to claim 15, said process further comprising:
  receiving, at the client device, a second font selection parameter identifying a second font, wherein the manifest information further comprises a second indication whether successful activation of the second font requires that the operating system provide certain baseline functionality;
  making a third determination that the second indication is affirmative, and in response to making the third determination, causing the operating system to attempt to activate a second stub font representing functionality provided by the second font; and
  making a fourth determination that the second stub font is not successfully activated, and in response to making the fourth determination, displaying an alert indicating that the second font is not supported.

19. The computer program product of claim 15, wherein the process further comprises, in response to making the second determination, causing the operating system to download the new technology font from a networked server before causing the operating system to activate the new technology font.

20. The computer program product of claim 15, wherein:
  the process further comprises, in response to making the second determination, causing the operating system to download the new technology font from a networked server; and
  the operating system attempts to activate the stub font before downloading the corresponding new technology font from the networked server.

* * * * *

UNITED STATES PATENT AND TRADEMARK OFFICE
CERTIFICATE OF CORRECTION

PATENT NO.        : 10,657,312 B2
APPLICATION NO.   : 15/816576
DATED             : May 19, 2020
INVENTOR(S)       : Sairus Patel Page 1 of 1

It is certified that error appears in the above-identified patent and that said Letters Patent is hereby corrected as shown below:

In the Claims

Column 14, Lines 29-30, Claim 9, please replace "that represents representing functionality" with --that represents functionality--.

Signed and Sealed this
Twenty-eighth Day of July, 2020

Andrei Iancu
*Director of the United States Patent and Trademark Office*